United States Patent
Weber et al.

(10) Patent No.: US 11,062,835 B2
(45) Date of Patent: Jul. 13, 2021

(54) VEHICLE TRANSFORMER

(71) Applicant: ABB Power Grids Switzerland AG, Baden (CH)

(72) Inventors: Benjamin Weber, Winterberg (DE); Karl-Heinz Zillmann, Marsberg (DE); Wolfgang Moenig, Brilon (DE)

(73) Assignee: ABB Power Grids Switzerland AG, Baden (SE)

( * ) Notice: Subject to any disclaimer, the term of this patent is extended or adjusted under 35 U.S.C. 154(b) by 1106 days.

(21) Appl. No.: 15/481,549

(22) Filed: Apr. 7, 2017

(65) Prior Publication Data

US 2017/0213633 A1 Jul. 27, 2017

Related U.S. Application Data

(63) Continuation of application No. PCT/EP2015/070938, filed on Sep. 14, 2015.

(30) Foreign Application Priority Data

Oct. 7, 2014 (EP) ..................................... 14003442

(51) Int. Cl.
*H01F 27/24* (2006.01)
*B60L 15/00* (2006.01)
(Continued)

(52) U.S. Cl.
CPC ............ *H01F 27/24* (2013.01); *B60L 15/007* (2013.01); *B61C 3/00* (2013.01); *H01F 27/02* (2013.01);
(Continued)

(58) Field of Classification Search
CPC ............................... H01F 27/24; B60L 15/007
See application file for complete search history.

(56) References Cited

U.S. PATENT DOCUMENTS 2,883,135 A * 4/1959 Smalley .................. H01F 27/06
248/230.5
3,062,495 A * 11/1962 Sloop ...................... H01F 27/06
248/205.1
(Continued)

FOREIGN PATENT DOCUMENTS

CN 201435290 Y 3/2010
DE 10203246 A1 8/2003
(Continued)

OTHER PUBLICATIONS

Examiner Requisition, Canadian Patent Application No. 2,963,943, dated Apr. 8, 2021, 4 pages.

*Primary Examiner* — Elvin G Enad
*Assistant Examiner* — Malcolm Barnes
(74) *Attorney, Agent, or Firm* — Sage Patent Group

(57) ABSTRACT

A vehicle transformer has a transformer core with two opposed yokes and at least two limbs extending in between them along a parallel limb axis, wherein a support structure is provided at each of the yokes for carrying the vehicle transformer with horizontal oriented limb axis, wherein a hollow cylindrical coil with at least one respective electrical winding is arranged around at least one of the limbs. The coil may be rigidly connected with the limb so that the flexural resistance of the rigid combination of both is improved therewith compared to a combination of both without rigid connection.

20 Claims, 3 Drawing Sheets

(51) Int. Cl.
*H01F 27/30* (2006.01)
*H01F 27/26* (2006.01)
*B61C 3/00* (2006.01)
*H01F 27/02* (2006.01)
*H01F 27/20* (2006.01)
*H01F 27/28* (2006.01)

(52) U.S. Cl.
CPC ............ *H01F 27/20* (2013.01); *H01F 27/266* (2013.01); *H01F 27/28* (2013.01); *H01F 27/306* (2013.01); *B60L 2200/26* (2013.01)

(56) References Cited

U.S. PATENT DOCUMENTS

| | | | | |
|---|---|---|---|---|
| 3,447,112 A * | 5/1969 | Broverman | ............ | H01F 27/085 336/60 |
| 3,720,897 A * | 3/1973 | Feather | ................. | H01F 27/306 336/60 |
| 3,783,426 A * | 1/1974 | Morris, Jr. | ............ | H01F 27/263 336/196 |
| 3,810,058 A * | 5/1974 | White | ................... | H01F 27/306 336/196 |
| 4,126,844 A * | 11/1978 | Hollister | ................... | H01F 5/02 29/605 |
| 4,663,604 A * | 5/1987 | VanSchaick | .......... | H01F 27/327 336/96 |
| 5,055,971 A * | 10/1991 | Fudala | ................... | H01F 17/041 336/210 |
| 6,326,877 B1 * | 12/2001 | Hay | ....................... | H01F 27/306 336/12 |
| 6,381,834 B1 * | 5/2002 | May | ....................... | H01F 27/306 29/602.1 |
| 2005/0275496 A1 * | 12/2005 | Pauley, Jr. | ............ | H01F 27/323 336/185 |
| 2009/0313812 A1 * | 12/2009 | Pulnikov | ............... | H01F 41/098 29/605 |
| 2010/0073898 A1 * | 3/2010 | Colson | .................... | H01F 27/06 361/809 |
| 2010/0162557 A1 * | 7/2010 | Pauley, Jr. | .............. | H01F 27/08 29/605 |
| 2011/0291791 A1 * | 12/2011 | Weber | ................... | B29C 70/865 336/222 |
| 2013/0113589 A1 * | 5/2013 | Luckey | ................... | H01F 27/06 336/68 |
| 2013/0181796 A1 * | 7/2013 | Weber | ..................... | H01F 27/36 336/60 |
| 2014/0132381 A1 | 5/2014 | Weber et al. | | |
| 2014/0151492 A1 * | 6/2014 | Brendel | ............... | H01F 27/306 242/600 |

FOREIGN PATENT DOCUMENTS

EP  2549495 A1  1/2013
EP  2592635 A1  5/2013

* cited by examiner

VEHICLE TRANSFORMER

CROSS-REFERENCE TO RELATED APPLICATIONS

This application is a bypass continuation of International Application No. PCT/EP2015/070938, filed on Sep. 14, 2015, and claims benefit to European Patent Application No. 14 003 442.2, filed on Oct. 7, 2014. The entire disclosure of each of which is hereby incorporated by reference herein. The International Application was published in English on Apr. 14, 2016, as WO 2016/055235 A1 under PCT Article 21(2).

FIELD

The invention is related to a vehicle transformer.

BACKGROUND

It is known that electrically driven vehicles, especially railway locomotives, require a mobile electrical transformer in order to adapt the voltage level supplied by an electrical supply system through an overhead line for example to the needs of electrical frequency converters or the like which are installed in the vehicle itself. A typical voltage level of an overhead transmission line is in the range of for example 1 kV to 100 kV. Normally the frequency converters generate a voltage with a controllable frequency and voltage level for supplying preferably asynchronous motors which drive the vehicle. The rated power of a railway locomotive for example might amount several MVA, wherein the rated power of an electric tram way might amount some 100 kVA.

A transformer is a known component in distribution networks which is normally not subject to major geometrical restrictions. A typical transformer in a distribution net-work has a vertical oriented limb axis and is not subject to any force impacts such as vehicle transformers are, for example when driving with a high speed of >200 kmlh into a curve.

In order to increase the useable space in a vehicle such as a train the components required for traction of the train—especially transformers and frequency converters—are arranged in an underfloor area and I or on the roof of the railway vehicle. Thus a typical train does not comprise a dedicated locomotive for traction which pulls several wagons moreover the components for traction are distributed on several wagons which all provide useable space for passengers. This useable space is normally the center area of the railway wagons respectively vehicles.

Disadvantageously within the state of the art is that the electrical components have to be arranged under the passenger space in an underfloor area and I or above the passenger space on the roof of the wagon respectively vehicle in a very limited space. Due to the always limited maximum cross section profile of a train or vehicle the space for arranging such electrical components is very limited, especially concerning its height. Also the weight of a vehicle transformer should be as less as possible so that the energy consumption of the vehicle in operation is reduced therewith.

SUMMARY

An aspect of the invention provides a vehicle transformer, comprising: a transformer core including a first yoke and a second yoke, the yokes being opposed, and a first limb and a second limb, the limbs extending in between the yokes along a parallel limb axis, wherein a support structure is provided at each of the yokes, configured to carry the vehicle transformer with horizontal oriented limb axis, wherein a hollow cylindrical coil with at least one respective electrical winding is arranged around each of the limbs, wherein the hollow cylindrical coil is rigidly connected with the limb so that a flexural resistance of a rigid combination of both is improved therewith compared to a combination of both without rigid connection.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
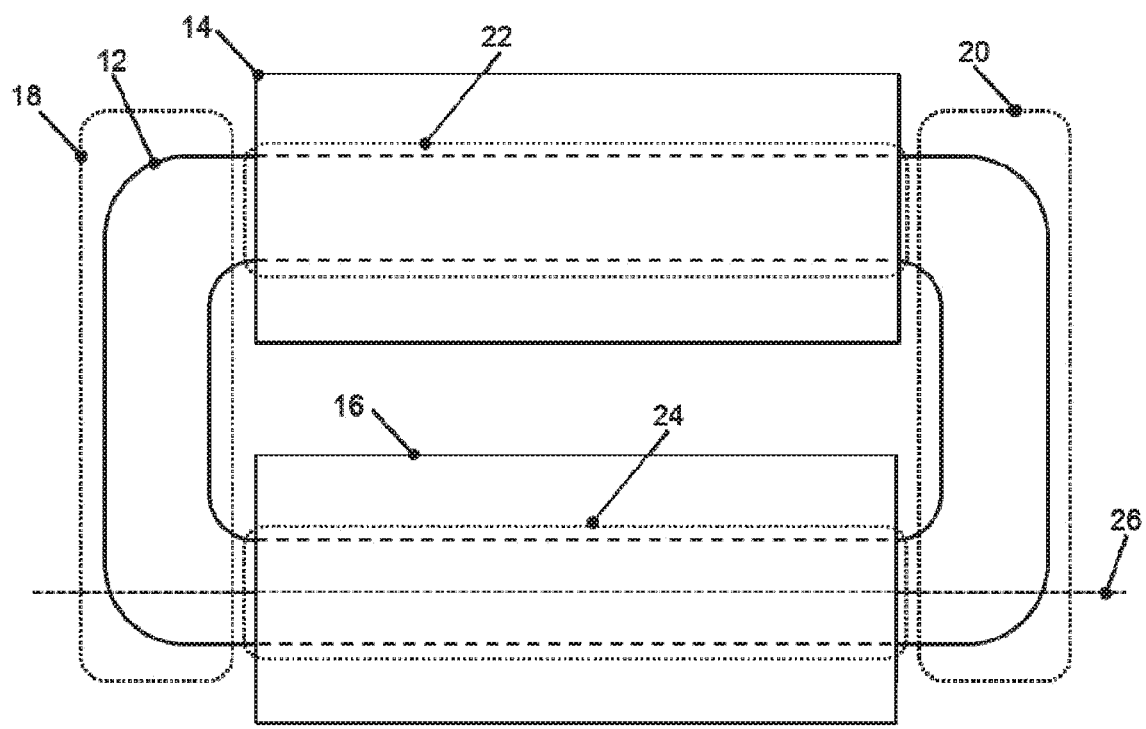
FIG. 1 an exemplary first vehicle transformer.

An aspect of the invention provides a vehicle transformer comprising a transformer core with two opposed yokes and at least two limbs extending inbetween them along a parallel limb axis, wherein a support structure is foreseen at each of the yokes for carrying the vehicle transformer with horizontal oriented limb axis and wherein a hollow cylindrical coil with at least one respective electrical winding is arranged around at least one of the limbs.

An aspect of the invention provides a compact lightweight vehicle transformer with a flat design which is on the other side robust against impacts respectively vibrations which occur while the vehicle is in motion.

An aspect of the invention is solved by a vehicle transformer characterized in that the coil is rigidly connected with the limb so that the flexural resistance of the rigid combination of both is improved therewith compared to a combination of both without rigid connection.

Basic idea of an aspect of the invention is to arrange the transformer core with horizontal arranged limb axis in order to reduce the height of the required space. Here a support structure is foreseen at each of the yokes for carrying the vehicle transformer with its full weight. Any additional mechanical support of the coil is not required the whole weight of the transformer is worn by the support structures in the yoke areas.

The limbs of a conventional stationary transformer are typically oriented vertically, so that the weight of the coils arranged around the limbs respectively the weight of the transformer core itself is easily borne by the transformer core without major flexural burden. On the other side the mechanical strength of a conventional transformer core, which is normally composed of several layers of sheeted metal, is not sufficient to bear its own weight and the weight of its coils in a horizontal position.

Normally a coil which is arranged on the limb of a transformer core is a component which does not improve the mechanical behavior of the core moreover it is a load, which has to be borne by the transformer core. According to the invention the coil is rigidly connected with the limb so that the coil itself increases the flexural resistance of the rigid combination of both. Precondition for this is that the coil itself is also of a rigid structure.

Thus the vehicle transformer according to the invention has a robust structure on one side and is compact in its design on the other side since further components for stabilization are not required. Especially the required height is reduced due to the horizontal arrangement of the limbs respectively coils. By this reason a vehicle transformer according to the invention can become designed in that way that it is placeable into the typically standardized space which is available underfloor or on the roof of a vehicle. Due to the reduced weight of the transformer a respective vehicle will also be more environmental friendly.

According to a further embodiment of the invention a fiber composite material is foreseen on the surface of the limb in order to increase its mechanical strength. Typically a transformer core consists of laminated metal sheets to reduce eddy current. A fiber composite material such as resin impregnated glass fiber roving which is hardened in a curing process after applying respectively winding it on the limb will significantly increase the mechanical stability and the flexural resistance of the limb.

According to a further embodiment of the invention limb and coil are rigidly connected at least in part by means of glue. During handling the glue material it is preferably in the liquid state wherein it becomes rigid after hardening so that in can be easily treated. This enables for example that the conductors of an electrical winding are directly wound on the limb respectively a fiber material on the limb without producing a separate coil in advance. The surface of the fiber material gives an improved grip for the glue material compared to the metal sheets of the core itself. A further advantage of this embodiment is that no bobbin or the like is required so that the radial space is used in an optimal way. Examples for a suitable glue are Körapox-Zweikomponenten Harz 735A,
Körapox-Zweikomponenten Harz 7358 or
Scotchcast Kleber Nr. 282.

According to a further embodiment of the invention the hollow cylindrical coil comprises a fiber composite material. The principle to increase the mechanical stability and the flexural resistance of a limb by a fiber composite material can also be applied on a coil. Fiber composite material is typically an electrical insulating material which is required inbetween different layers of electrical conductors anyhow. So no further space is required for increasing the flexural resistance of the coil.

According to the invention the fiber material is preferably arranged in that way that the mechanical stability of the coil is increased in an efficient way. A respective embodiment is characterized in that the hollow cylindrical coil comprises several layers of a wound a fiber composite material in different radial distances along approximately the whole axial extension of the coil so that it has for instance the mechanical strength of a monolithic block. The stability might be improved by applying a band shaped material with a width that is similar to the axial length of the coil so that an axial overlap is avoided. A suitable composite material is for example a resin impregnated glass fiber material or Prepreg, which is a pre-impregnated band-like material, wherein the resin for impregnation is in the B-stage. This means that it is in a solid state but it will be molten during a curing process and hardened thereafter.

According to another embodiment of the invention preferably axially oriented battens are foreseen in a radial space in between limb and coil, so that hollow cylindrical arranged axial channels are built. The battens are preferably made from a rigid material and glued on the surface of the limb respectively the surface of a surrounding fiber composite material. In a comparable way the battens are additionally glued on the radial inner surface of the coil. So the battens are fully integrated in the rigid structure of limb and coil. In an advantageous way cooling channels are built therewith so that the vehicle transformer can be cooled during operation in an efficient way. Axial cooling channels can also be foreseen inbetween radial adjacent layers of conductors of the coil.

According to another embodiment of the invention the coil extends along approximately the whole axial length of the limb. So the space for the transformer is used in the most efficient way on the one side and the mechanical stability of the limb is improved along its whole length in an advantageous way.

According to another embodiment of the invention a respective hollow cylindrical coil is arranged around each of the limbs. Also here the available space is used in the most efficient way and the weight of the transformer is not unnecessarily increased therewith. Since the electrical supply of vehicles such as trains is normally realized with only one overhead conductor and a ground connection, a typical vehicle trans-former is single phased, so one primary and one secondary winding are foreseen. Optionally a third winding, for example for supplying a heat radiator for the passenger room of a vehicle, might be foreseen. A winding might be divided into two or more parts which are electrically connected in series. Thus a preferred embodiment of the invention is a two limb transformer with two coils, wherein the electrical windings are distributed in that way on the two coils, that they have at least approximately the same size.

According to a further embodiment of the invention the support structure comprises a beam structure from an approximately wave-shaped strip of metal at each yoke, wherein peaks and lows of the beam structure extend along parallel lines.

An underfloor area of a vehicle like a railway wagon is typically prepared to accommodate a certain number of casings respectively modules with a standardized size. In order to make the casings mountable respectively exchangeable in an easy way, at least for the underfloor variant a standardized traverse beam at the bottom of each casing is foreseen at its both axial ends. In order to increase the available height in each casing the height of the traverse beams is reduced and they have an increased width instead. Thus a support structure has to be foreseen at each of the yokes for carrying the vehicle transformer in a vertical distance to the traverse beams. The support structure has to fulfill criteria concerning a minimum weight on one side and a required degree of stiffness on the other side, so that the vehicle transformer is safely mounted on the traverse beams, even in case of horizontal impacts from the side caused for example by an accident.

According to another embodiment of the invention the beam structure is arranged under each of the yokes of the transformer core with horizontal oriented limb axis and connected thereto by at least two screw- or bolt-connections for each yoke extending through the peaks of the beam structure and through the whole thickness of the yokes. Bolts or screws extending through the whole thickness of the yokes provide a save and easily mountable connection, wherein the stability of the transformer core is increased in an advantageous way therewith.

According to another embodiment of the invention a C-profile shaped traverse beam is arranged under the beam structure and connected thereto by at least two screw- or bolt-connections through the lows of the beam structure. The C-profile shape of the traverse beam provides an additional reduction of weight with a high degree of mechanical stability.

According to a further embodiment of the invention the beam structure is designed in that way, that it withstands horizontal impacts from the side. Due to reasons of safety respective regularities exist in different countries, which have to be fulfilled. The design of the beam structure can be modified by adapting the axial width of the wave-shaped strip, adapting the numbers of waves or adapting the thickness of the material for example. A simulation by use of a finite element program can be used to verify suitability of a certain design. A suitable design comprises for example 4 waves with a vertical distance of for example 40 cm in between peaks and lows, wherein the width of the wave shaped strip amounts 30 cm for example.

According to a further embodiment of the invention the vehicle transformer is mounted in an underfloor area of a railway-vehicle. Thus the advantages of a small, light and robust design of the vehicle transformer are implemented into a vehicle.

According to a further embodiment of the invention the vehicle transformer is arranged in a casing with a blower for cooling. The casing is made from sheets of steel for example. Since the whole weight of the vehicle transformer is carried by the yokes the casing has no structural function moreover its purpose is to protect the vehicle transformer against environmental conditions such as dust or water. A blower, preferably comprising an air-filter unit, enables a forced air cooling of the transformer. The shape of the casing corresponds preferably to a standardized module size for railway wagons.

According to a further embodiment of the invention the cross section of the yokes respectively limbs is approximately rectangular. Thus the required volume of the vehicle transformer is once more reduced in an advantageous way.

Further advantageous embodiments of the invention are mentioned in the dependent claims.

FIG. 1 shows an exemplary first vehicle transformer 10 from a top view. A ring like rectangular shaped transformer core 12 comprises two yokes 18, 20 and two limbs 22, 24 extending parallel to a limb axis 26 in between the yokes 18, 20. A respective hollow cylindrical coil 14, 16 is arranged around each of the limbs 22, 24 along their nearly whole axial extension. The limb axis 26 of the vehicle transformer is oriented horizontal so that the vertical required space is reduced therewith. Limbs 22, 24 and coils 14, 16 are rigidly connected by means of glue, so that the flexural resistance of the combination of both is improved in an advantageous way therewith.

Figure 2:
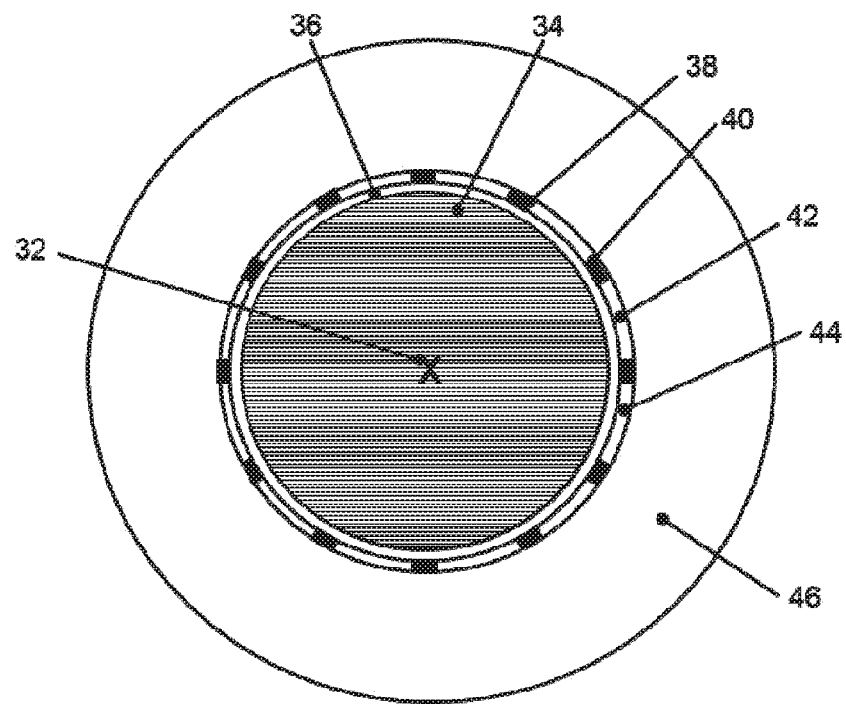
FIG. 2 a first exemplary coil rigidly connected with a limb.

FIG. 2 shows a first exemplary coil 46 rigidly connected with a limb 34 in a sketch 30. The limb 34 consists of several layers of stacked metal sheets which have an approximately round common cross section extending around a limb axis 32. On the radial outer side of the limb 34 a wound layer of a fiber composite material 36 is fore-seen in order to give the limb 34 an improved mechanical strength. On the radial outer surface of the layer of fiber composite material 36 several axial oriented battens 38, 40 are glued on in an equal tangential distance each to each other. On the radial outer side of the battens 38, 40 a hollow cylindrical coil 46 with a not shown electrical winding is glued on. The hollow cylindrical coil 46 is enforced by several not shown layers of a fiber composite material so that its consistency is stiff. In the radial space in between limb 34 and coil 46 hollow cylindrical arranged axial channels 42, 44 are foreseen as cooling channels. Since limb 34 and coil 46 are rigidly connected together by means of glue the combination of both has a mechanical strength of a monolithic block with a high flexural resistance.

Figure 3:
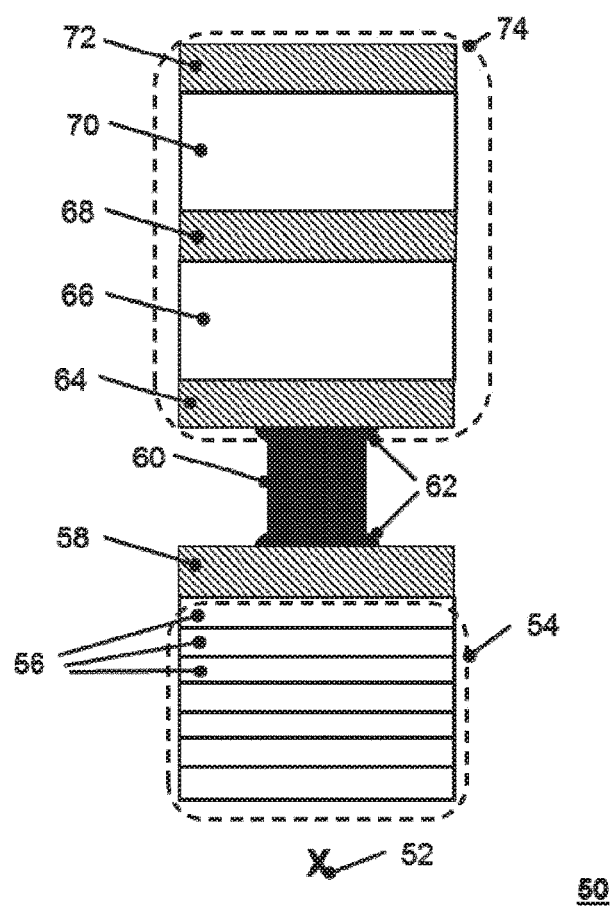
FIG. 3 a second exemplary coil rigidly connected with a limb.

FIG. 3 shows a section of a second exemplary coil 74 rigidly connected with a limb 54 in a sketch 50. The limb 54 consists of several layers of stacked metal sheets 56 with a circular cross section extending around a limb axis 52, whereas only a part of the cross section is shown in this sketch. A layer of fiber composite material 58 on the radial outer surface of the limb 54 increases its mechanical strength and flexural resistance. The hollow cylindrical coil 74 comprises several alternating layers of fiber composite material 64, 68, 72 and electrical windings 66, 70. Due to the fiber compo-site material 64, 68, 72, which is also present inbetween the conductor loops of the windings 66, 70, the coil 74 has a stiff consistency and high mechanical strength. Limb 54 and coil 74 are rigidly connected with axially arranged battens 60, which are glued 62 in a radial space in between.

Figure 4:
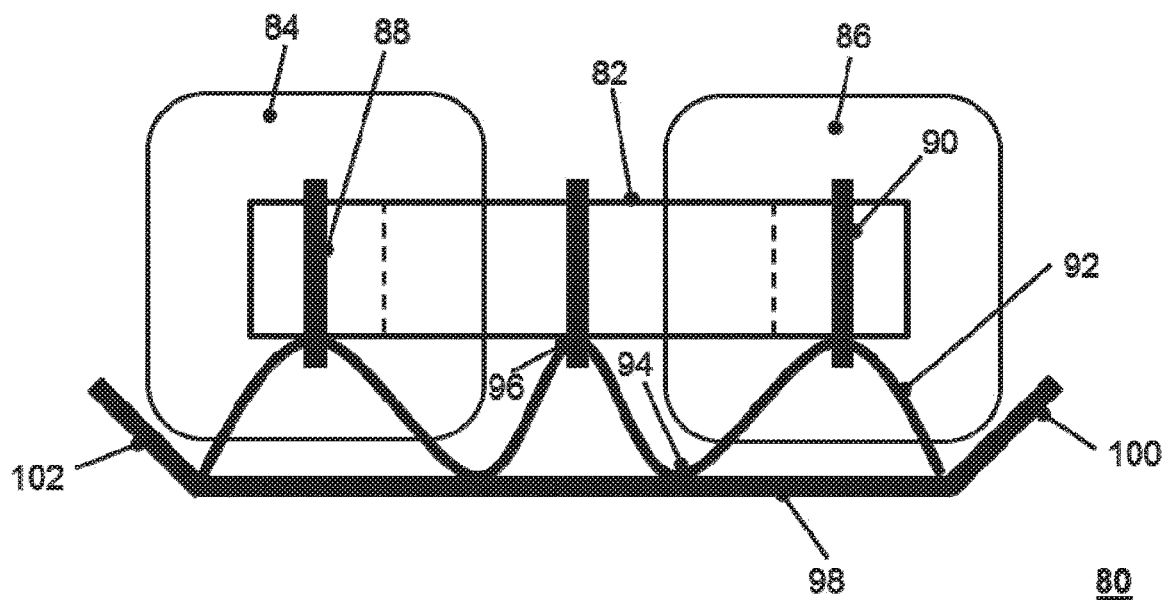
FIG. 4 a vehicle transformer on a beam structure.

FIG. 4 shows a vehicle transformer on a beam structure 92 in a sketch 80. The vehicle transformer comprises a transformer core with two opposed yokes 82 and horizontal oriented limbs with respective coils 84, 86 arranged around them. The yokes 82 of the transformer core are borne by a respective wave shaped beam structure 92 which is connected to the yokes by means of bolts 88, 90 at its peaks 96. The bolts 88, 90 are extending through the whole thickness of the yokes 82 so that an increased mechanical stability of the transformer core is gained therewith. The lower side of the beam structure 92 is borne by a traverse C-profile shaped beam 98 which is connected with the lows 94 of the beam structure 92 by further bolts. At both sides of the C-profile shaped beam 98 respective brackets 100, 102 are foreseen in order to connect the whole structure with the underfloor area of a vehicle. The composed shape of the C-profile beam 98 and the brackets 100, 102 corresponds to the outer limit of an exemplary profile which is allowed for the underfloor area of a railway wagon.

Figure 5:
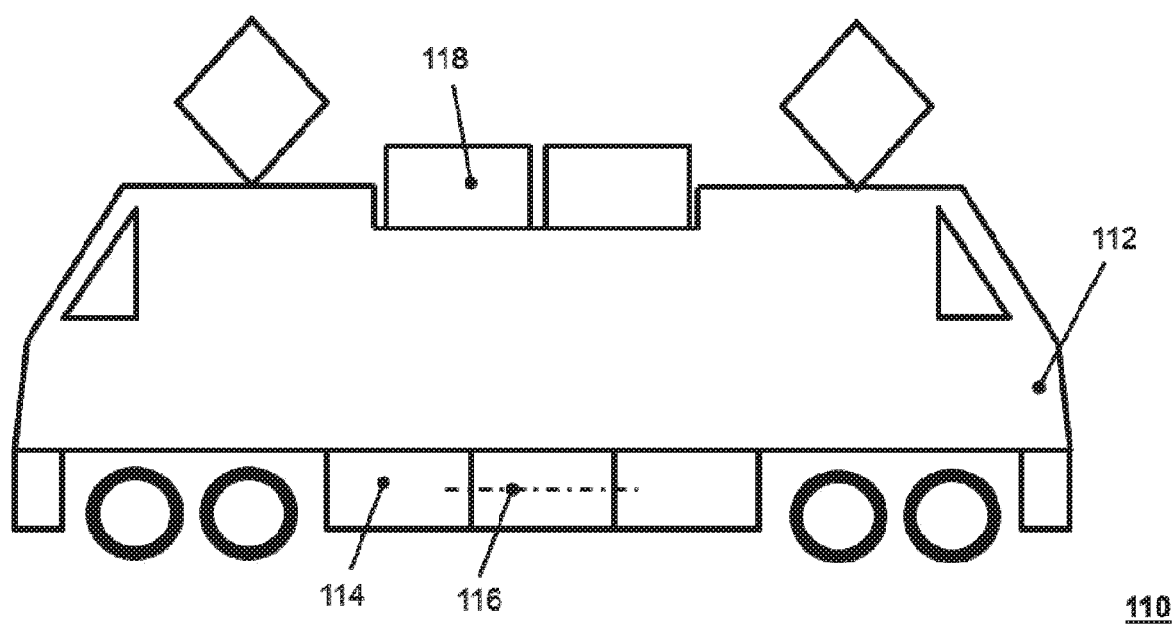
FIG. 5 an exemplary vehicle with vehicle transformer.

FIG. 5 shows an exemplary vehicle 112 with vehicle transformer in a sketch 110. The vehicle 112 is a railway locomotive which provides space for three standardized underfloor modules and two roof modules. In one of the underfloor modules a vehicle transformer 114 is arranged, wherein the horizontal limb axis 116 is oriented in driving direction. On one of the roof modules a further vehicle transformer 118 is arranged.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS 10 exemplary first vehicle transformer
12 transformer core
14 first hollow cylindrical coil of first vehicle transformer
16 second hollow cylindrical coil of first vehicle transformer
18 first yoke of transformer core
20 second yoke of transformer core
22 first limb of transformer core
24 second limb of transformer core
26 limb axis
30 first exemplary coil rigidly connected with limb
32 limb axis
34 limb
36 layer of fiber composite material
38 first axially oriented batten
40 second axially oriented batten
42 first axial channel
44 second axial channel
46 coil
50 second exemplary coil rigidly connected with limb
52 limb axis
54 limb
56 metal sheets of limb
58 layer of fiber composite material
60 batten
62 glue
64 first wound layer of fiber composite material
66 first electrical winding
68 second wound layer of fiber composite material
70 second electrical winding
72 third wound layer of fiber composite material
74 coil
80 vehicle transformer on beam structure
82 yoke of transformer core
84 first coil of vehicle transformer
86 second coil of vehicle transformer
88 first bolt
90 second bolt
92 exemplary beam structure
94 low of beam structure
96 peak of beam structure
98 C-profile shaped beam
100 first bracket
102 second bracket
110 exemplary vehicle with vehicle transformer
112 vehicle
114 vehicle transformer mounted in an underfloor area
116 vehicle transformer mounted in a roof area

The invention claimed is:
1. A vehicle transformer, comprising:
a transformer core including a first yoke and a second yoke, the yokes being opposed, and a first limb and a second limb, the limbs extending in between the yokes along a parallel limb axis,
wherein a support structure is provided at each of the yokes, configured to carry the vehicle transformer with horizontal oriented limb axis,
wherein a hollow cylindrical coil with at least one respective electrical winding is arranged around each of the limbs,
wherein the hollow cylindrical coil is rigidly connected with the limb so that a flexural resistance of a rigid combination of both is improved therewith compared to a combination of both without rigid connection, and
wherein the support structure includes a beam structure from an approximately wave-shaped strip of metal at each yoke.
2. The transformer of claim 1, further comprising:
a fiber composite material arranged on a surface of the first and/or second limb in order to increase its mechanical strength.
3. The transformer of claim 1, wherein the first and/or second limb and the hollow cylindrical coil are rigidly connected at least in part using glue.
4. The transformer of claim 1, further comprising battens, provided in a radial space in between at least one of the limbs and the hollow cylindrical coil, so as to form hollow cylindrical arranged axial channels.
5. The transformer of claim 4, wherein the battens are axially oriented.
6. The transformer of claim 1, wherein the hollow cylindrical coil extends along approximately an entire axial length of the limb.
7. A vehicle transformer, comprising:
a transformer core including a first yoke and a second yoke, the yokes being opposed, and a first limb and a second limb, the limbs extending in between the yokes along a parallel limb axis,
wherein a support structure is provided at each of the yokes, configured to carry the vehicle transformer with horizontal oriented limb axis,
wherein a hollow cylindrical coil with at least one respective electrical winding is arranged around each of the limbs,
wherein the hollow cylindrical coil is rigidly connected with the limb so that a flexural resistance of a rigid combination of both is improved therewith compared to a combination of both without rigid connection, and,
wherein the support structure includes a beam structure from an approximately wave-shaped strip of metal at each yoke,
wherein peaks and lows of the beam structure extend along parallel lines.
8. The transformer of claim 7, wherein the hollow cylindrical coil includes a fiber composite material.
9. The transformer of claim 8, wherein the hollow cylindrical coil includes two or more layers of a wound fiber composite material in different radial distances along approximately a whole axial extension of the hollow cylindrical coil so as to have a mechanical strength of a monolithic block.
10. The transformer of claim 7, wherein the beam structure is arranged under each of the yokes of the transformer core with a horizontally oriented limb axis and connected thereto using at least two screw or bolt connections for each yoke extending through the peaks of the beam structure and through an entire thickness of the yokes.

11. The transformer of claim 10, further comprising:
a C-profile shaped beam arranged under the beam structure and connected thereto using at least two screw or bolt connections through the lows of the beam structure.

12. The transformer of claim 7, wherein the beam structure is configured such that it withstands horizontal impacts from its side.

13. The transformer of claim 7, configured to be mounted in an underfloor area of a railway-vehicle.

14. A casing, comprising:
the transformer of claim 7, arranged in the casing; and
a blower configured to cool the transformer and/or the casing.

15. The transformer of claim 7, wherein a cross section of the yokes respectively limbs is approximately rectangular.

16. A railway-vehicle, comprising:
the transformer of claim 7, mounted in an underfloor area of the railway-vehicle.

17. The transformer of claim 7, further comprising:
a fiber composite material arranged on a surface of the first and/or second limb in order to increase its mechanical strength.

18. The transformer of claim 7, wherein the first and/or second limb and the hollow cylindrical coil are rigidly connected at least in part using glue.

19. The transformer of claim 7, further comprising battens, provided in a radial space in between at least one of the limbs and the hollow cylindrical coil, so as to form hollow cylindrical arranged axial channels.

20. The transformer of claim 7, wherein the hollow cylindrical coil extends along approximately an entire axial length of the limb.

* * * * *